United States Patent
Mitsugi

(10) Patent No.: US 7,394,859 B2
(45) Date of Patent: Jul. 1, 2008

(54) OFDM SIGNAL RECEIVING APPARATUS AND AN OFDM SIGNAL RECEIVING METHOD

(75) Inventor: Jun Mitsugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 639 days.

(21) Appl. No.: 10/919,396

(22) Filed: Aug. 17, 2004

(65) Prior Publication Data
US 2005/0105461 A1    May 19, 2005

(30) Foreign Application Priority Data
Aug. 21, 2003  (JP)  ............... 2003-297816
Aug. 9, 2004   (JP)  ............... 2004-232685

(51) Int. Cl.
*H04K 1/10* (2006.01)
(52) U.S. Cl. .................................... 375/260
(58) Field of Classification Search ............. 375/260, 375/261, 298, 296, 299; 332/159
See application file for complete search history.

(56) References Cited
U.S. PATENT DOCUMENTS
2006/0039331 A1    2/2006   Abeta et al.

FOREIGN PATENT DOCUMENTS
JP   2001-197032   7/2001
JP   2001-268048   9/2001

OTHER PUBLICATIONS

Takeshi Onizawa, et al., "A Novel Channel Estimation Scheme Employing Adaptive Selection of Frequency-Domain Filters for OFDM Systems", IEICE Trans. Commun., vol. E82-B, No. 12, Dec. 1999, pp. 1923-1931.

*Primary Examiner*—Khai Tran
(74) *Attorney, Agent, or Firm*—Oblon, Spivak, McClelland, Maier & Neustadt, P.C.

(57) ABSTRACT

An apparatus includes a converter separating the OFDM signal into the several sub-carriers, an extraction circuit extracting the reference symbol from at least one of a plurality of sub-carriers, an estimation circuit estimating a transmission distortion channel every the sub-carrier based on the amplitude and phase characteristic of the reference symbol, an adder adding channel estimation results of a first sub-carrier be set at least one of the plurality of sub-carriers, a second sub-carrier adjacent to a high-band side of the first sub-carrier and a third sub-carrier adjacent to a low-band side of the first sub-carrier, a calculator calculating the average of the added value to obtain amplitude and phase correction values with respect to the first sub-carrier, and a correction circuit correcting amplitude and phase with respect to each of the plurality of sub-carriers based on the amplitude and phase correction values.

15 Claims, 7 Drawing Sheets

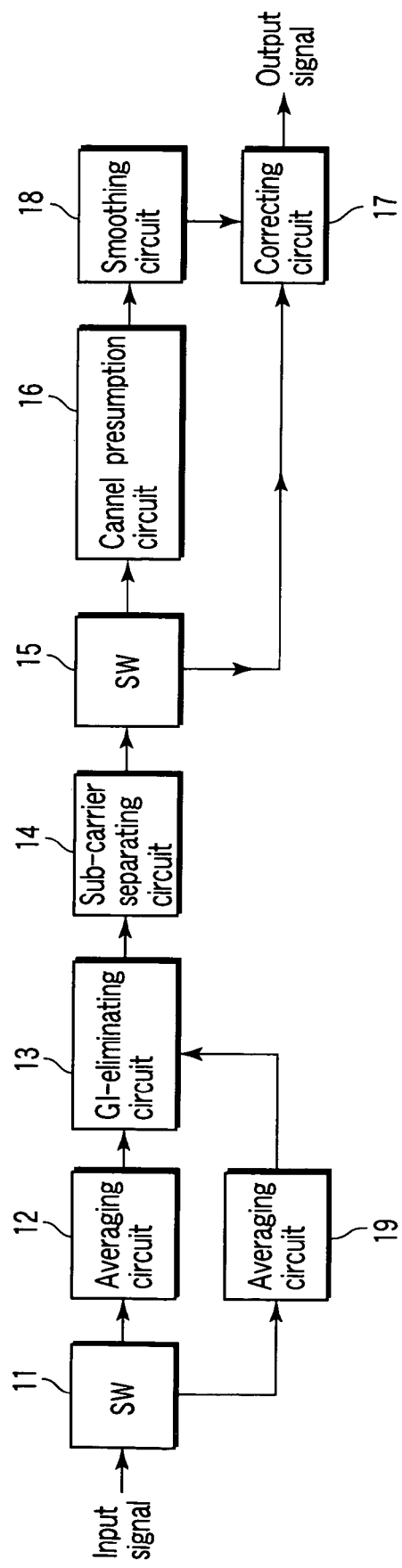
F I G. 9

OFDM SIGNAL RECEIVING APPARATUS AND AN OFDM SIGNAL RECEIVING METHOD

CROSS-REFERENCE TO RELATED APPLICATIONS

This application is based upon and claims the benefit of priority from prior Japanese Patent Applications No. 2003-297816, filed Aug. 21, 2003; and No. 2004-232685, Aug. 9, 2004, the entire contents of both of which are incorporated herein by reference.

BACKGROUND OF THE INVENTION

1. Field of the Invention

The present invention relates to a multi-carrier radio transmission system such as OFDM (Orthogonal Frequency Division Multiplexing) radio transmission system. In particular, the present invention relates to apparatus and method for receiving an OFDM signal.

2. Description of the Related Art

According to one of multi-carrier, that is, OFDM, information is transmitted using several sub-carriers orthogonal to each other. Under radio communication environment, amplitude and phase variations (distortion) occur in a received signal by Rayleigh fading and multi-path due to a change of relatively positional relation between transmitter and receiver. When synchronizing detection is made, the foregoing distortion generated in a radio communication channel must be estimated for every sub-carrier.

In a wireless LAN system, a preamble signal (known signal) is sent to a header of a transmission frame. The preamble signal is used, and thereby, distortion in the transmission channel is estimated (channel estimation).

However, it is insufficient to only calculate a channel estimation value from the preamble signal; in this case, accuracy is worse, and also, the receiving characteristic is reduced. For this reason, there has been so far proposed a method of improving the accuracy of the channel estimation value estimated from the preamble signal. According to the foregoing method, a channel estimation value (vector value) is calculated from the preamble signal for every sub-carrier. Thereafter, a vector average is taken with respect to several channel estimation values to carry out smoothing (see, for example, Document 1: JPN. PAT. APPLN. KOKAI Publication No. 2001-197032, and Document 2: JPN. PAT. APPLN. KOKAI Publication No. 2001-268048).

According to the channel estimation method described above, a vector average is taken to carry out smoothing between sub-carriers. However, the channel estimation method has a problem that the channel estimation accuracy is reduced if the transmission channel variation between sub-carriers is large. In other words, the transmission channel variation between sub-carriers is large; nevertheless, a vector average of several sub-carriers is taken. In this case, the averaged vector receives the influence of sub-carrier having large amplitude; as a result, the phase difference between sub-carriers becomes non-uniform.

BRIEF SUMMARY OF THE INVENTION

It is, therefore, an object of the present invention to provide apparatus and method for receiving an OFDM signal, which are capable of improving channel estimation accuracy even if a variation between sub-carriers is large in a radio transmission channel.

According to an aspect of the present invention, there is provided an apparatus for receiving an OFDM (Orthogonal Frequency Division Multiplexing) signal multiplexing a reference symbol having known amplitude and phase characteristic to at least one of a plurality of sub-carriers orthogonal to each other, comprising: a converter which converts the OFDM signal into a plurality of sub-carriers; an extraction circuit to extract the reference symbol from at least one of a plurality of sub-carriers; an estimation circuit to estimate a transmission channel distortion for each of the sub-carriers based on the known amplitude and phase characteristic of the reference symbol to obtain a plurality of channel estimation results; an estimation processing circuit which adds the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier; a calculating unit configured to obtain amplitude and phase correction values on the first sub-carrier by averaging the added results, while the first sub-carrier is shifted sequentially; and a correction circuit to correct amplitude and phase of each of the plurality of sub-carriers based on the amplitude and phase correction values.

According to another aspect of the present invention, there is provided a method of receiving an OFDM (Orthogonal Frequency Division Multiplexing) signal multiplexing a reference symbol having known amplitude and phase characteristic to at least one of a plurality of sub-carriers orthogonal to each other, comprising: converting the OFDM signal into a plurality of sub-carriers; extracting the reference symbol from at least one of a plurality of sub-carriers; estimating a transmission channel distortion for each of the sub-carriers based on the known amplitude and phase characteristic of the reference symbol to obtain a plurality of channel estimation results; adding the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier; obtaining amplitude and phase correction values on the first sub-carrier by averaging the added results, while the first sub-carrier is shifted sequentially; and correcting amplitude and phase of each of the plurality of sub-carriers based on the amplitude and phase correction values.

According to yet another aspect of the present invention, there is provided an apparatus for receiving an OFDM (Orthogonal Frequency Division Multiplexing) signal multiplexing a reference symbol having known amplitude and phase characteristic to at least one of a plurality of sub-carriers orthogonal to each other, comprising: converting means for converting the OFDM signal into a plurality of sub-carriers; extracting means for extracting the reference symbol from at least one of a plurality of sub-carriers; estimating means for estimating a transmission channel distortion for each of the sub-carriers based on the known amplitude and phase characteristic of the reference symbol to obtain a plurality of channel estimation results; estimation processing means for adding the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier; obtaining means for obtaining amplitude and phase correction values on the first sub-carrier by averaging the added results, while the first sub-carrier is shifted sequentially; and correcting means for correcting amplitude and phase of each of the plurality of sub-carriers based on the amplitude and phase correction values.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 9 is a block diagram showing the configuration of principal parts of a demodulator included in a receiver of the OFDM radio transmission system according to other embodiment;

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the accompanying drawings.

FIRST EMBODIMENT

Figure 1:
FIG. 1 is a view showing the format of a signal handled in the OFDM radio transmission system according to a first embodiment.

An OFDM radio transmission system according to one embodiment has estimation of handling a format signal shown in FIG. 1. According to format, two preamble signals (preambles P1 and P2) continuously appear in the leading end of a transmission frame, that is, header area. The preamble signals each have known amplitude and phase characteristic for transmission channel response estimation. Guard interval GI is added to the front end of the preamble. A data area exists after guard interval GI at the back of the preamble P2. In the data area, pilot symbol having known amplitude and phase characteristic is not always inserted to all carriers.

Here, the OFDM symbol is composed of n sub-carriers.

Figure 2:
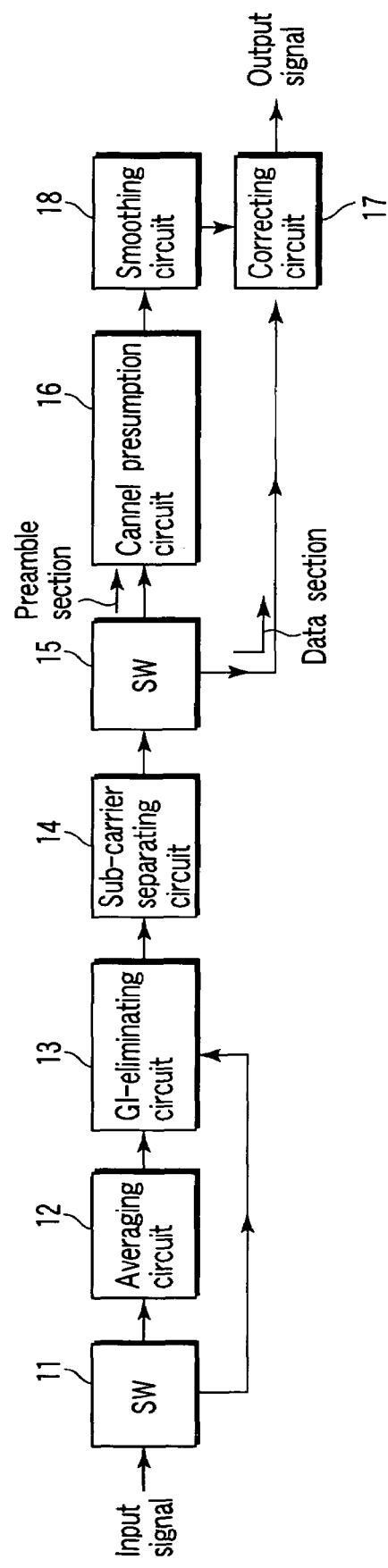
FIG. 2 is a block diagram showing the configuration of principal parts of a demodulator included in a receiver of the OFDM radio transmission system according to the first embodiment.

FIG. 2 is a block diagram showing the configuration of principal parts of a demodulator included in a receiver of the OFDM radio transmission system.

In FIG. 2, a received OFDM signal (hereinafter, referred to as received signal) is guided to the leading header area of the transmission frame via a switch 11. The guard interval (GI) and two preamble signals are guided to an average circuit 12. Data symbol (including guard interval) following the preamble signal is guided to a guard interval (GI) elimination circuit 13. The average circuit 12 averages in to the time axial direction with respect to guard interval and preamble signals.

The GI elimination circuit 13 eliminates guard intervals from an input signal from the switch 11 based on an average signal outputted from the average circuit 12. The received signal eliminating guard interval is subjected to FFT (Fast Fourier Transform) and DFT (Discrete Fourier transform) by a sub-carrier separation circuit 14. By doing so, the received signal is converted from a time axial signal into a frequency axial signal. The preamble section is supplied to a channel estimation circuit 16 via a switch 15; on the other hand, the data section is supplied to a correction circuit 17 via the switch 15. The frequency axial signal is a signal in which each sub-carrier component is separated.

The channel estimation circuit 16 extracts pilot symbol from at least part of several sub-carriers. Thereafter, the circuit 16 outputs a difference (n sub-carriers) between a preamble value of the pilot symbol and each sub-carrier value obtained from the preamble section of the received signal to a smoothing circuit 18.

The smoothing circuit 18 smoothes the received signal using a transmission channel estimation value with respect to n sub-carriers continuing on the frequency axis, obtained from the channel presumption circuit. By doing so, the smoothing circuit 18 generates a new transmission channel estimation value. In the following, the new transmission channel estimation value calls an improved transmission channel estimation value.

The correction circuit 17 multiplies sub-carriers of the received signal (data symbol) by a conjugate complex number of the improved transmission channel estimation value obtained from the smoothing circuit 18.

The average circuit 12 will be described below with reference to FIG. 3.

Figure 3:
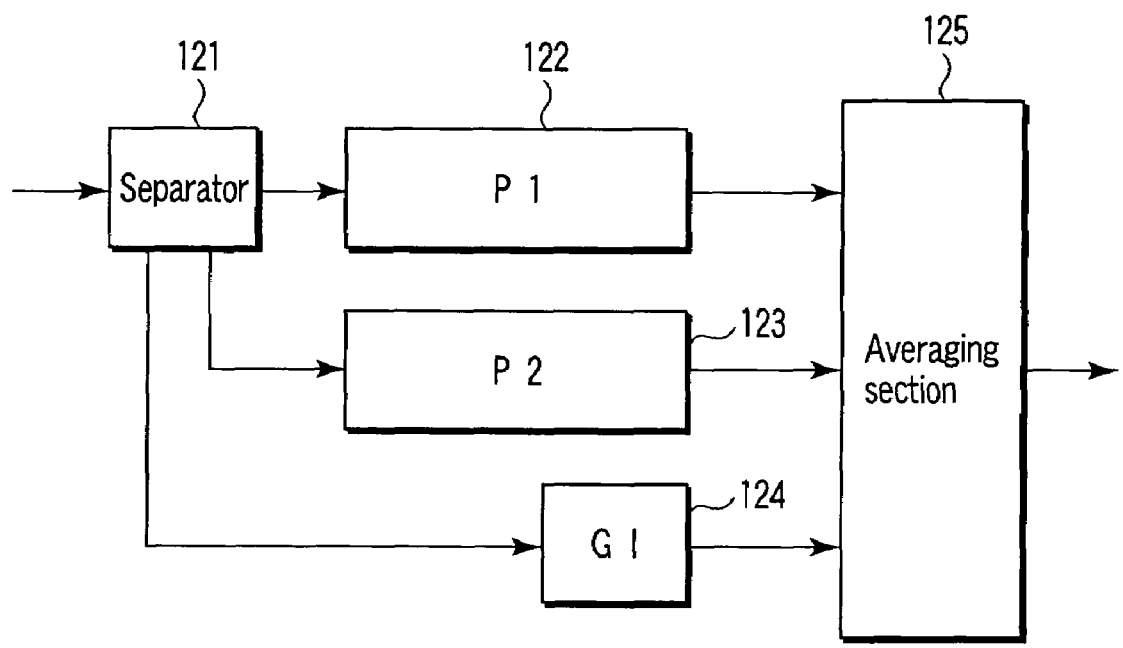
FIG. 3 is a block diagram showing the configuration of the average circuit shown in FIG. 2.

As shown in FIG. 3, a separator 121 of the average circuit 12 separates the received signal into preamble signal (P1), preamble signal (P2) and guard interval (GI). Preamble signals P1 and P2 are the same. The GI is the same as the back portion of the P1. The foregoing P1, P2 and GI are temporarily stored in buffers 122, 123 and 124, respectively, and thereafter, supplied to an average section 125.

The average section 125 averages these P1, P2 and GI, and thereby, it is possible to improve S/N ratio (receiving sensitivity). In this case, P1 and P2 have the same length; however, GI is shorter than P1. For this reason, two kinds of averages, that is, the average of only P1 and P2, and the average of P1, P2 and GI are given.

For example, the P1 value is set as PT1(J): J=1 ... n, the P2 value is set as PT2(J): J=1 ... n, and the GI value is set as GIT(J): 1 ... m (m is the length of GI). The average of P1 and P2 is expressed by the following equation.

$$\{PT1(J)+PT2(J)\}/2$$

where, J=1 ... n−m

On the other hand, the average of P1, P2 and GI is expressed by the following equation.

$$\{PT1(J)+PT2(J)+GIT(J-n+m)\}/3$$

where, J=n−m+1 . . . n

The GI is added to the average, and thereby, the S/N ratio is improved; therefore, the accuracy of the transmission channel response estimation value is also enhanced. In the embodiment, the average corresponding to the length of GI (i.e., m averages) is taken. In this case, the average including GI may be less than m averages considering synchronization error and the influence of delay wave in multi-path.

The smoothing circuit 18 will be detailedly explained below with reference to FIG. 4.

Figure 4:
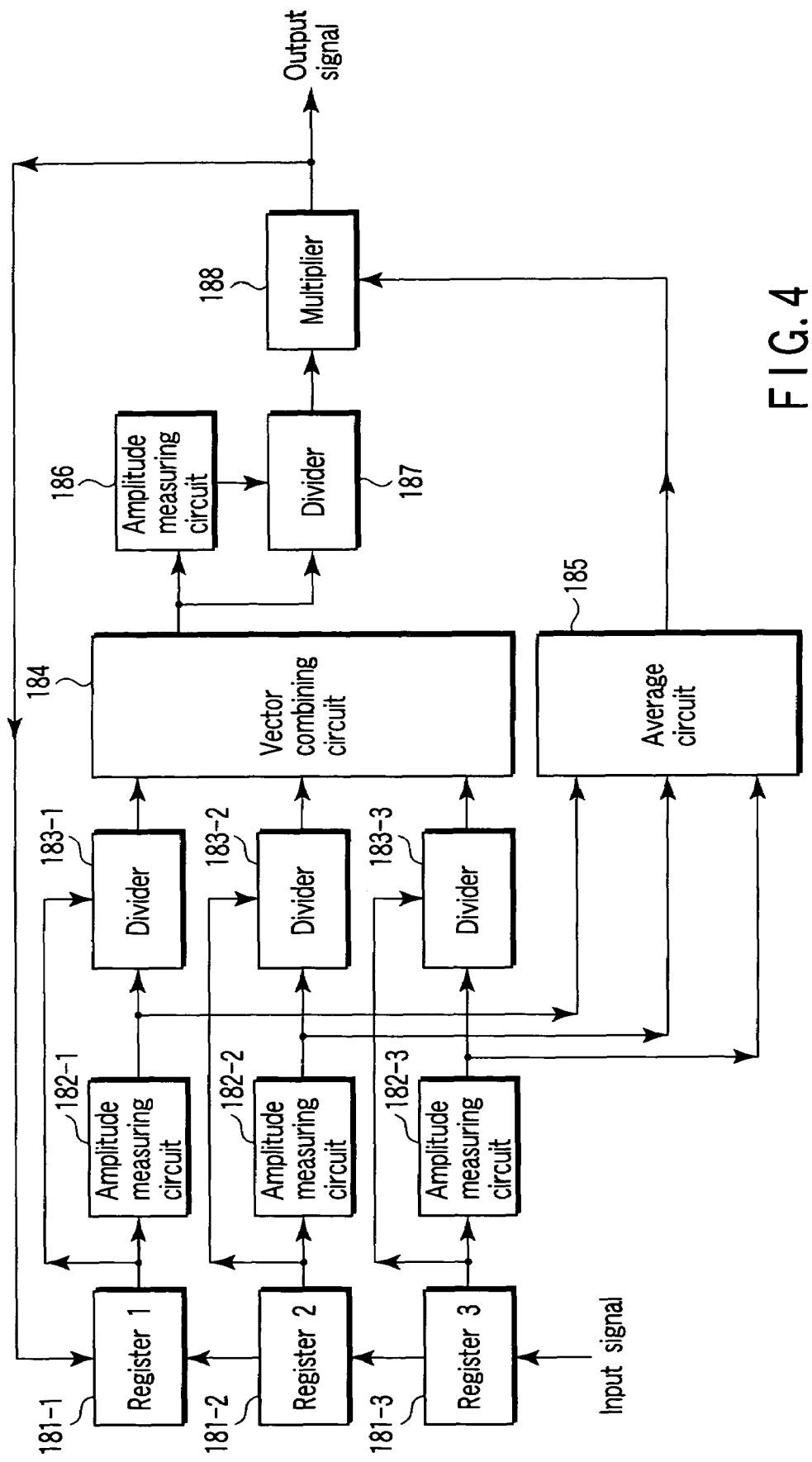
FIG. 4 is a block diagram showing the configuration of the smoothing circuit shown in FIG. 2.

As depicted in FIG. 4, the smoothing circuit 18 is composed of three registers 181-1 to 181-3, amplitude measuring circuits 182-1 to 182-3, 186, dividers 183-1 to 183-3, 187, and multiplier 188.

The amplitude measuring circuits 182-1 to 182-3 and 186 calculate the amplitude of the vector value. The dividers 183-1 to 183-3 and 187 are used for dividing each vector into a unit vector. The vector combining circuit 184 combines each unit vector. The average circuit 185 calculates the average amplitude of three vectors. The multiplier 188 multiplies the unit vector outputted from the vector combining circuit 184 by the output of the average circuit 185.

The operation of the smoothing circuit 18 having the foregoing configuration will be explained below with reference to FIG. 5 to FIG. 7.

Figure 5:
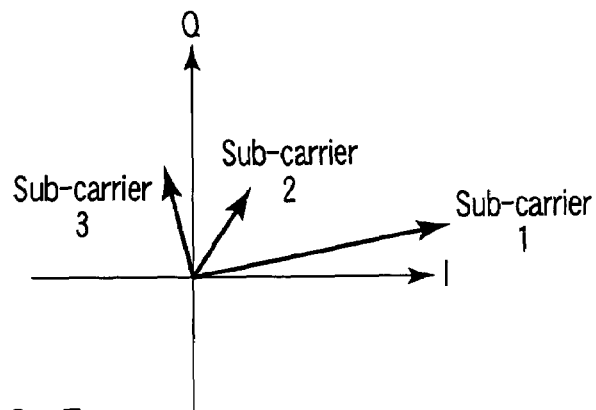
FIG. 5 is a view to explain a conventional transmission channel estimation value to sub-carrier.
Figure 6:
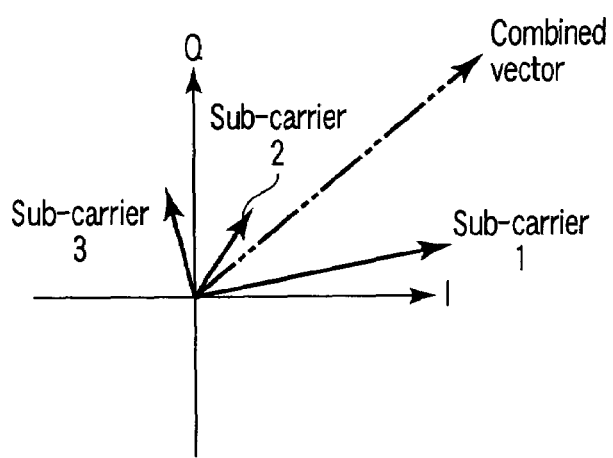
FIG. 6 is a view to explain a conventional correction method.

As shown in FIG. 5, amplitude variation shown by sub-carriers 1 to 3 exists in the channel estimation value detected from the preamble. In this case, when smoothing is carried out with respect to the sub-carrier 2, the vector average of sub-carriers 1 to 3 is taken as a phase of the sub-carrier 2. As a result, the phase difference between the sub-carriers 1 and 2 becomes narrow due to the sub-carrier 1 whose combined vector has large amplitude, as seen from FIG. 6.

Figure 7:
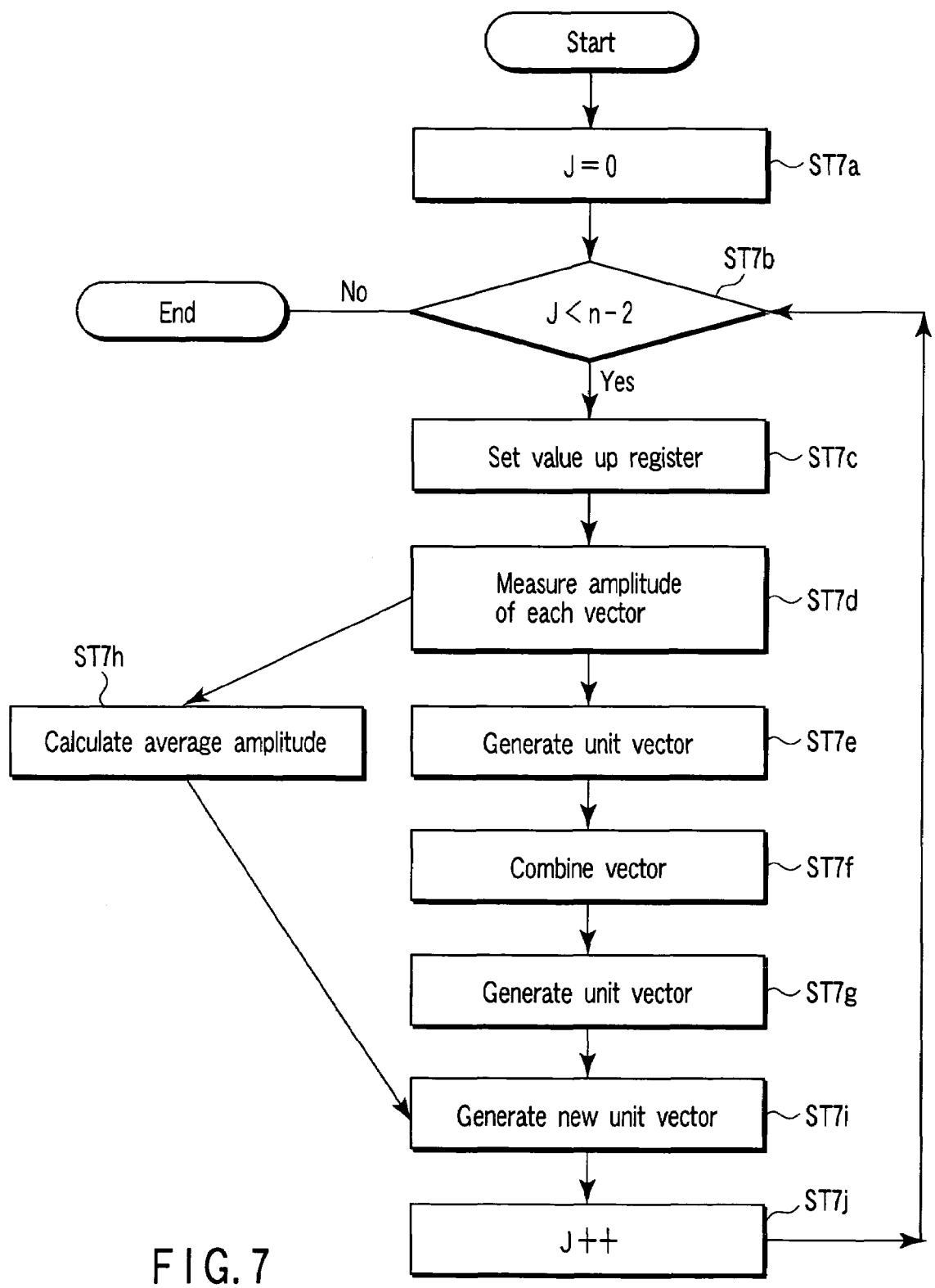
FIG. 7 is a flowchart showing the process sequence of the smoothing circuit according to the first embodiment.

According to the embodiment, the smoothing circuit 18 performs the procedures shown in FIG. 7.

Here, the output from the channel estimation circuit 16 is set as H(J): J=1 . . . n. When starting the control procedure, the smoothing circuit 18 makes the initial boot setting of J=0 (step ST7*a*). The smoothing circuit 18 determines whether or not J is smaller than n−2 (step ST7*b*). If J is smaller than n−2 (Yes), the process sequence proceeds to step ST7*c*.

In step ST7*c*, the initial value of the registers 181-1 to 181-3 is set as follows: the register 181-1 is H(1), the register 181-2 is H(2) and the register 181-3 is H(3). The amplitude measuring circuits 182-1 to 182-3 calculate vector amplitude values A1, A2 and A3 stored in the registers 181-1 to 181-3, respectively (step ST7*d*). The vector amplitude values A1, A2 and A3 are expressed as follows.

$$A1=|H(1)|$$

$$A2=|H(2)|$$

$$A3=|H(3)|$$

The divider 183-1 to 183-3 divides vectors by their amplitude value to generate individual unit vectors, and thereafter, input them to the vector combining circuit 184 (step ST7*e*). The vector combining circuit 184 combines three unit vectors thus obtained (step ST7*f*). Three unit vectors are expressed as follows.

$$H(1)/A1+H(2)/A2+H(3)/A3$$

The amplitude measuring circuit 186 calculates the amplitude A4 of the vector combined in step ST7*f*, and thereafter, the divider 187 generates a unit vector V1 (step ST7*g*). The amplitude A4 of the vector combined and the unit vector V1 are expressed by the following each equation $$A4=|H(1)/A1+H(2)/A2+H(3)/A3|$$

$$V1=(H(1)/A1+H(2)/A2+H(3)/A3)/A4$$

On the other hand, the average circuit 185 calculates the average amplitude value A5 of vectors H(1), H(2) and H(3) (step ST7*h*). The average amplitude value A5 is expressed by the following equation.

$$A5=(A1+A2+A3)/3$$

The multiplier 188 multiplies the unit vector V1 by the average amplitude AS (step ST7*i*).

Figure 8:
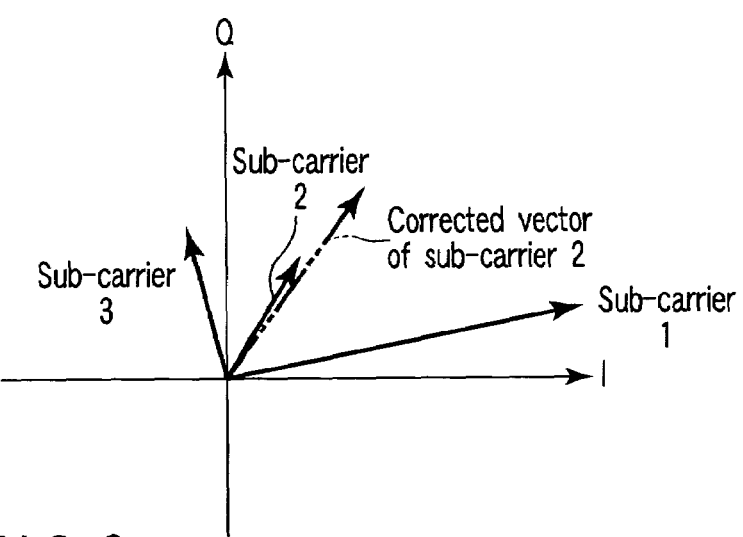
FIG. 8 is a view to explain vector correction in the first embodiment.

The multiplied value is a corrected value of the vector H(2), that is, a vector shown by the dotted line of FIG. 8.

Then, the output value is written to the register 181-1. The register 181-2 shifts the value of the register 181-3. A new input signal H(4) is written to the register 181-3 (step ST7*j*).

The same calculation as described above is made to obtain a corrected value of the vector H(3). The foregoing procedure is made, and thereby, vectors H(n) are inputted to the register 181-3, and thereafter, correction is completed. In other words, of channel estimation values H(1) to H(n), correction on H(2) to H(n−1) is made. Both ends of the sub-carrier, that is, correction on H(1) and H(n) is not made.

Smoothing of the channel estimation value is carried out using the simple calculation described above. By doing so, the phase difference between sub-carriers is approximately equalized, so that the channel estimation accuracy can be improved.

Incidentally, the number of averages is three; however, the present invention is not limited to three averages.

According to the embodiment, the channel estimation circuit 16 calculates individual channel estimation values with respect to several sub-carriers from amplitude and phase characteristic using the pilot symbol included in the OFDM signal. The smoothing circuit 18 adds unit channel estimation values of the sub-carrier, sub-carrier adjacent to high-band side and sub-carrier adjacent to low-band side. The average value of the added value is calculated, and thereby, it is possible to prepare amplitude and phase correction values for correcting transmission channel distortion. Therefore, the channel estimation accuracy is improved with simple calculation without using special measuring circuits.

According to the embodiment, the average circuit 12 calculates the average value of the preamble signal and the guard interval, so that SN can be improved. Therefore, the accuracy of the transmission channel response estimation value is improved.

The foregoing embodiment has explained about the average of preamble and GI used for channel estimation. Likewise, channel estimation is possible with respect to the data section of the signal. FIG. 9 shows the configuration of the receiver. In FIG. 9, the same reference numerals are used to designate the components identical to FIG. 2, and the details are omitted.

Figure 10:
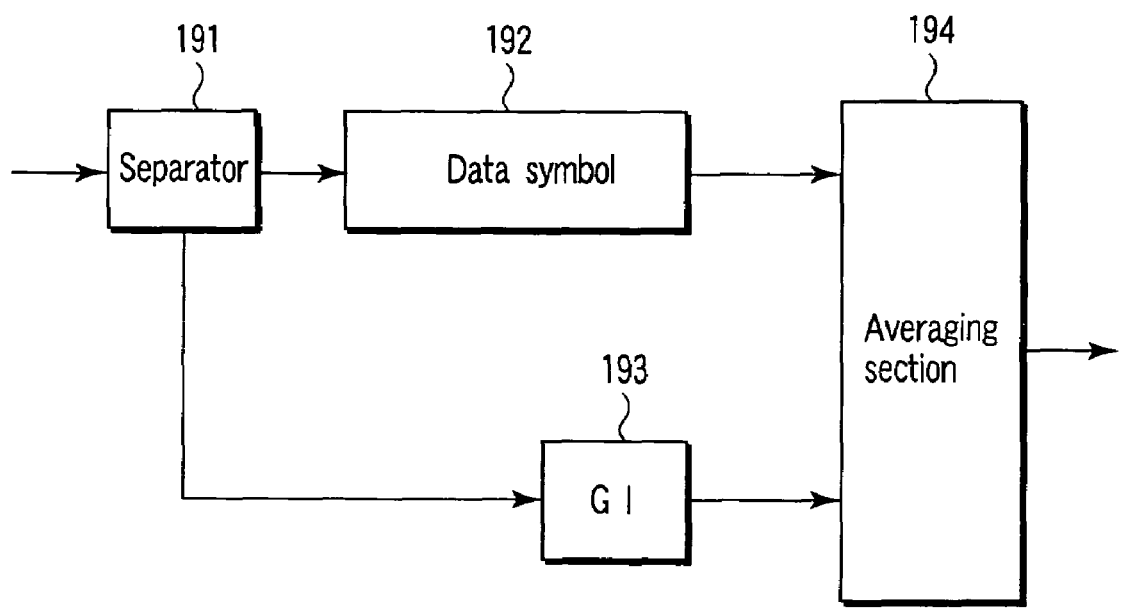
FIG. 10 is a block diagram showing the configuration of the average circuit shown in FIG. 9.

More specifically, an average circuit 19 is connected between the switch 11 and the GI elimination circuit 13. As shown in FIG. 10, a separator 191 of the average circuit 19 separates the received signal into data symbol and guard interval (GI). The GI is the same as the back portion of the data symbol. The foregoing data symbol and GI are temporarily stored in buffers 192 and 193, respectively, and thereafter, supplied to an average section 194.

The average section 194 averages these data symbol and GI, and thereby, it is possible to improve S/N ratio. In this case, GI is shorter than the data symbol; for this reason, average is made with respect to only overlapping portion of the data symbol and the GI.

For example, the data symbol value is set as DT1(J): J=1 ... n, and the GI value is set as GIT1(J): 1 ... h (h is the length of GI). The average portion of the data symbol and the GI is expressed by the following equation.

$$\{DT1(J)+GIT1(J-n+h)\}/2$$

where, J=n−h+1 ... n

The GI is added to the average, and thereby, the S/N ratio is improved; therefore, the accuracy of the data symbol is also enhanced. As a result, receiving characteristic is improved. In the embodiment, the average corresponding to the length of GI (i.e., h averages) is taken. In this case, the average including GI may be less than m averages considering synchronization error and the influence of delay wave in multi-path.

SECOND EMBODIMENT

Figure 11:
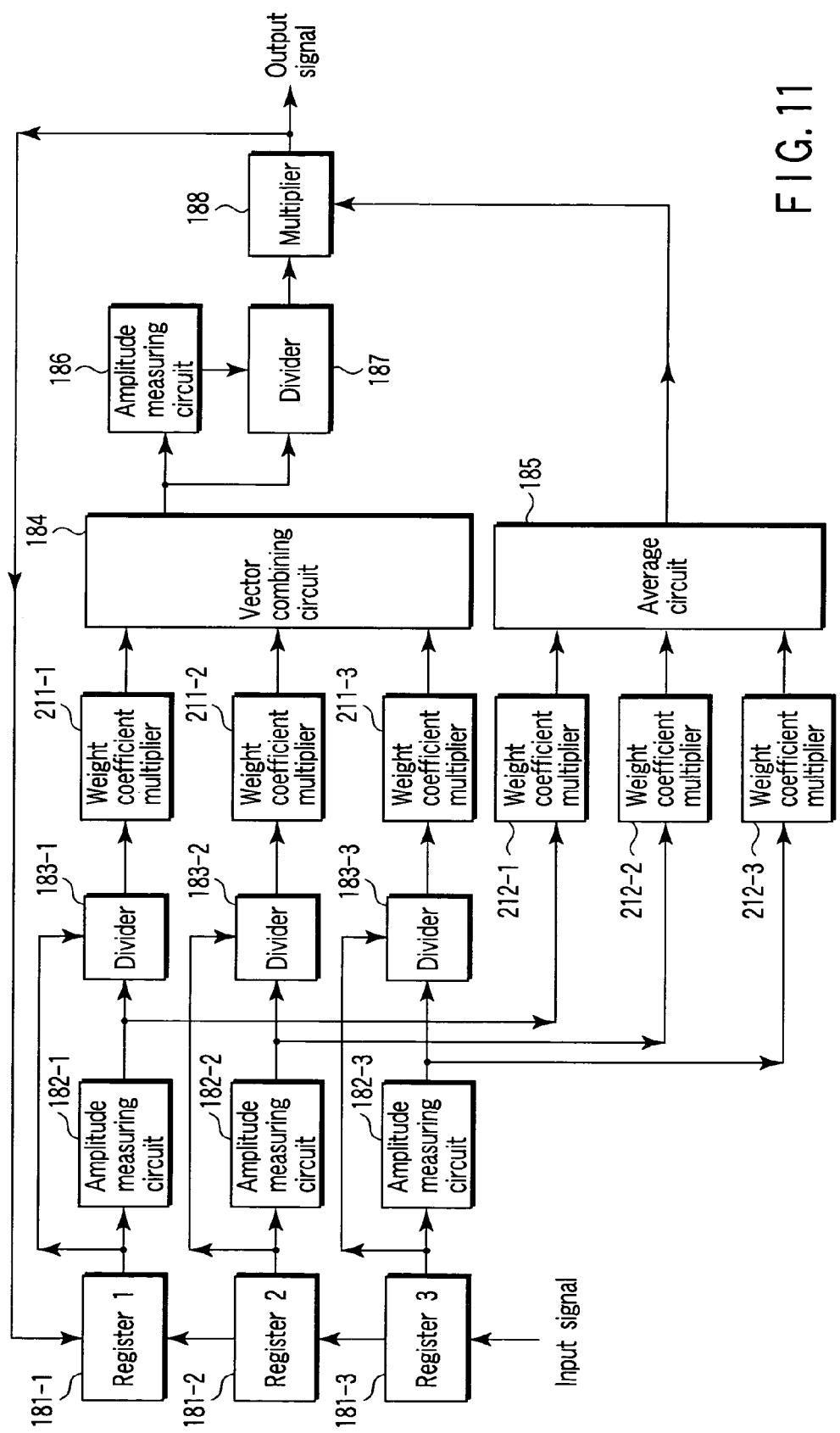
FIG. 11 is a block diagram showing the configuration of the smoothing circuit according to a second embodiment of the present invention.

FIG. 11 is a block diagram showing the configuration of the smoothing circuit 18 according to a second embodiment of the present invention. In FIG. 11, the same reference numerals are used to designate parts identical to FIG. 4, and the details are omitted.

More specifically, a weight coefficient multiplier 211-1 to 211-3 is connected between the divider 183-1 to 183-3 and the vector combining circuit 184. A weight coefficient multiplier 212-1 to 212-3 is connected between the amplitude measuring circuit 182-1 to 182-3 and the average circuit 185.

The weight coefficient multiplier 211-1 to 211-3 multiplies the unit vector outputted from the divider 183-1 to 183-3 by a weight coefficient. The weight coefficient multiplier 212-1 to 212-3 multiplies the output of the amplitude measuring circuit 182-1 to 182-3 by a weight coefficient. The weight coefficient is set $\alpha$ for the value from the register 181-1, is set $\beta$ for the value from the register 181-2, and is set $\alpha$ for the value from the register 181-3. The weight coefficient is realized a relation of $2\alpha+\beta=1$. Incidentally, the weight coefficient "$\beta$" is set smaller than the weight coefficient "$\alpha$".

The value of $\alpha$ is set "1/8" if the multi-path of the transmission channel is larger than a standard value, and is set "1/3" if the multi-path of the transmission channel is no larger than the standard value. The value of $\beta$ is set "3/4" if the multi-path of the transmission channel is larger than the standard value, and is set "1/3" if the multi-path of the transmission channel is no larger than the standard value.

Here, the output from the channel estimation circuit 16 is set as H(J): J=1 ... n. When starting the control procedure, the initial value of the registers 181-1 to 181-3 is set as follows: the register 181-1 is H(1), the register 181-2 is H(2) and the register 181-3 is H(3). The amplitude measuring circuits 182-1 to 182-3 calculate vector amplitude values A1, A2 and A3 stored in the registers 181-1 to 181-3. The vector amplitude values A1, A2 and A3 are expressed as follows.

$$A1=|H(1)|$$

$$A2=|H(2)|$$

$$A3=|H(3)|$$

The divider 183-1 to 183-3 divides the vectors by their amplitude value to generate individual unit vectors, and thereafter, inputs them to the weight coefficient multiplier 211-1 to 211-3. The weight coefficient multiplier 211-1 to 211-3 multiplies the output of the divider 183-1 to 183-3 by a weight coefficient, and thereafter, inputs them to the vector combining circuit 184. The vector combining circuit 184 combines three unit vectors thus obtained. Three unit vectors are expressed as follows.

$$\alpha H(1)/A1+\beta H(2)/A2+\alpha H(3)/A3$$

The amplitude measuring circuit 186 calculates the amplitude A4 of the vector combined, and thereafter, the divider 187 generates a unit vector V1. The amplitude A4 of the vector combined and the unit vector V1 are expressed by the following each equation $$A4=|\alpha H(1)/A1+\beta H(2)/A2+\alpha H(3)/A3|$$

$$V1=(\alpha H(1)/A1+\beta H(2)/A2+\alpha H(3)/A3)/A4$$

On the other hand, the weight coefficient multiplier 212-1 to 212-3 multiplies the output of the amplitude measuring circuit 182-1 to 182-3 by a weight coefficient, and thereafter, inputs them to the average circuit 185. The average circuit 185 calculates the average amplitude value A5 of vectors $\alpha H(1)$, $\beta H(2)$ and $\alpha H(3)$. The average amplitude value A5 is expressed by the following equation.

$$A5=(\alpha A1+\beta A2+\alpha A3)/3$$

The multiplier 188 multiplies the unit vector V1 by the average amplitude A5.

The multiplied value is a corrected value of the vector H(2).

Then, the output value is written to the register 181-1. The register 181-2 shifts the value of the register 181-3. A new input signal H(4) is written to the register 181-3.

The same calculation as described above is made to obtain a corrected value of the vector H(3). The foregoing procedure is made, and thereby, vectors H(n) are inputted to the register 181-3, and thereafter, correction is completed. In other words, of channel estimation values H(1) to H(n), correction on H(2) to H(n−1) is made. Both ends of the sub-carrier, that is, correction on H(1) and H(n) is not made.

Smoothing of the channel estimation value is carried out using the simple calculation described above. By doing so, the phase difference between sub-carriers is approximately equalized, so that the channel estimation accuracy can be improved.

Incidentally, the number of averages is three; however, the present invention is not limited to three averages. The coefficient $\alpha$ and $\beta$ may be arbitrarily set in accordance with a condition of the transmission channel (i.e., the number of the multi-path).

According to the second embodiment, the channel estimation accuracy is improved in accordance with a condition of the transmission channel.

OTHER EMBODIMENTS

The present invention is not limited to the foregoing embodiment, and at the working stage of the invention, modifications of constituent components may be made within the scope without departing from the inventive concept. Several constituent components disclosed in the foregoing embodiment are properly combined, and thereby, various inventions are formable. For example, some components may be deleted from all constituent components. In addition, constituent components of different embodiment may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for receiving an OFDM (Orthogonal Frequency Division Multiplexing) signal multiplexing a reference symbol having known amplitude and phase characteristic to at least one of a plurality of sub-carriers orthogonal to each other, comprising:
    a converter which converts the OFDM signal into a plurality of sub-carriers;
    an extraction circuit to extract the reference symbol from at least one of a plurality of sub-carriers;
    an estimation circuit to estimate a transmission channel distortion for each of the sub-carriers based on the known amplitude and phase characteristic of the reference symbol to obtain a plurality of channel estimation results;
    an estimation processing circuit which adds the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier;
    a calculating unit configured to obtain amplitude and phase correction values on the first sub-carrier by averaging the added results, while the first sub-carrier is shifted sequentially;
    a correction circuit to correct amplitude and phase of each of the plurality of sub-carriers based on the amplitude and phase correction values; and
    wherein the estimation processing circuit multiplies the result of the first sub-carrier, the result of the second sub-carrier, and the result of the third sub-carrier by respective weight coefficients, and adds the multiplied values.

2. The apparatus according to claim 1, further comprising:
    when the OFDM signal has a transmission frame structure in which a header area and a data area exist, a guard interval and a preamble are arranged in the header area, and a plurality of data symbols with the guard interval are arranged in the following data area,
    a processor which processes to divide the OFDM signal into the header area and the data area, and averages the header area in a time axis direction.

3. The apparatus according to claim 2, wherein the processor divides the OFDM signal into the header area and the data area, and averages them in a time axis direction.

4. The apparatus according to claim 1, wherein the reference symbol is a pilot symbol.

5. The apparatus according to claim 1, wherein the weight coefficients are a plurality of coefficients different from one another in accordance with a condition of the transmission channel.

6. A method of receiving an OFDM (Orthogonal Frequency Division Multiplexing) signal multiplexing a reference symbol having known amplitude and phase characteristic to at least one of a plurality of sub-carriers orthogonal to each other, comprising:
    converting the OFDM signal into a plurality of sub-carriers;
    extracting the reference symbol from at least one of a plurality of sub-carriers;
    estimating a transmission channel distortion for each of the sub-carriers based on the known amplitude and phase characteristic of the reference symbol to obtain a plurality of channel estimation results;
    adding the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier;
    obtaining amplitude and phase correction values on the first sub-carrier by averaging the added results, while the first sub-carrier being shifted sequentially;
    correcting amplitude and phase of each of the plurality of sub-carriers based on the amplitude and phase correction values; and
    multiplying the result of the first sub-carrier, the result of the second sub-carrier, and the result of the third sub-carrier by respective weight coefficients, and adding the multiplied values.

7. The method according to claim 6, further comprising:
    when the OFDM signal has a transmission frame structure in which a header area and a data area exist, a guard interval and a preamble are arranged in the header area, and a plurality of data symbols with the guard interval are arranged in the following data area,
    dividing the OFDM signal into the header area and the data area, and averaging the header area in a time axis direction.

8. The method according to claim 7, wherein the dividing includes dividing the OFDM signal into the header area and the data area, and averaging them in a time axis direction.

9. The method according to claim 6, wherein the reference symbol is a pilot symbol.

10. The method according to claim 6, wherein the weight coefficients are a plurality of coefficients different from one another in accordance with a condition of the transmission channel.

11. An apparatus for receiving an OFDM (Orthogonal Frequency Division Multiplexing) signal multiplexing a reference symbol having known amplitude and phase characteristic to at least one of a plurality of sub-carriers orthogonal to each other, comprising:
    converting means for converting the OFDM signal into a plurality of sub-carriers;
    extracting means for extracting the reference symbol from at least one of a plurality of sub-carriers;
    estimating means for estimating a transmission channel distortion for each of the sub-carriers based on the known amplitude and phase characteristic of the reference symbol to obtain a plurality of channel estimation results;
    estimation processing means for adding the channel estimation results every several sub-carriers of the sub-carriers to obtain a plurality of added values, the several sub-carriers including a first sub-carrier corresponding to the at least one of the several sub-carriers, a second sub-carrier adjacent to a high-band side of the first sub-carrier and a third sub-carrier adjacent to a low-band side of the first sub-carrier;

obtaining means for obtaining amplitude and phase correction values on the first sub-carrier by averaging the added results, while the first sub-carrier is shifted sequentially; and correcting means for correcting amplitude and phase of each of the plurality of sub-carriers based on the amplitude and phase correction values;

wherein the estimation processing means multiplies the result of the first sub-carrier, the result of the second sub-carrier, and the result of the third sub-carrier by respective weight coefficients, and adds the multiplied values.

12. The apparatus according to claim 11, further comprising:

when the OFDM signal has a transmission frame structure in which a header area and a data area exist, a guard interval and a preamble are arranged in the header area, and a plurality of data symbols with the guard interval are arranged in the following data area, dividing means for dividing the OFDM signal into the header area and the data area, and averaging the header area in a time axis direction.

13. The apparatus according to claim 12, wherein the dividing means divides the OFDM signal into the header area and the data area, and averages them in a time axis direction.

14. The apparatus according to claim 11, wherein the reference symbol is a pilot symbol.

15. The apparatus according to claim 11, wherein the weight coefficients are a plurality of coefficients different from one another in accordance with a condition of the transmission channel.

* * * * *